(No Model.) 2 Sheets—Sheet 1.
W. & I. DARBY.
HEATING ATTACHMENT FOR OIL STOVES.

No. 571,722. Patented Nov. 17, 1896.

(No Model.) 2 Sheets—Sheet 2.
W. & I. DARBY.
HEATING ATTACHMENT FOR OIL STOVES.

No. 571,722. Patented Nov. 17, 1896.

Witnesses:
John C. Wilson
Percy C. Bowen

Inventors
Walter Darby,
Ion Darby,
By Whitman & Wilkinson
Attorneys

THE NORRIS PETERS CO., PHOTO-LITHO., WASHINGTON, D. C.

UNITED STATES PATENT OFFICE.

WALTER DARBY AND ION DARBY, OF LONDON, ENGLAND, ASSIGNORS OF ONE-THIRD TO JOHN HENRY PUNCHARD, OF SAME PLACE.

HEATING ATTACHMENT FOR OIL-STOVES.

SPECIFICATION forming part of Letters Patent No. 571,722, dated November 17, 1896.

Application filed February 17, 1896. Serial No. 579,554. (No model.)

*To all whom it may concern:*

Be it known that we, WALTER DARBY and ION DARBY, subjects of the Queen of Great Britain, of The Weston Works, Weston Street, King's Cross, London, England, have invented certain new and useful Improvements in Heating Attachments for Oil-Stoves, of which the following is a specification.

This invention relates to heating attachments for oil or gas stoves; and it consists of certain novel features hereinafter described and claimed.

Reference is had to the accompanying drawings, in which the same parts are indicated by the same letters throughout the several views.

Figure 1:
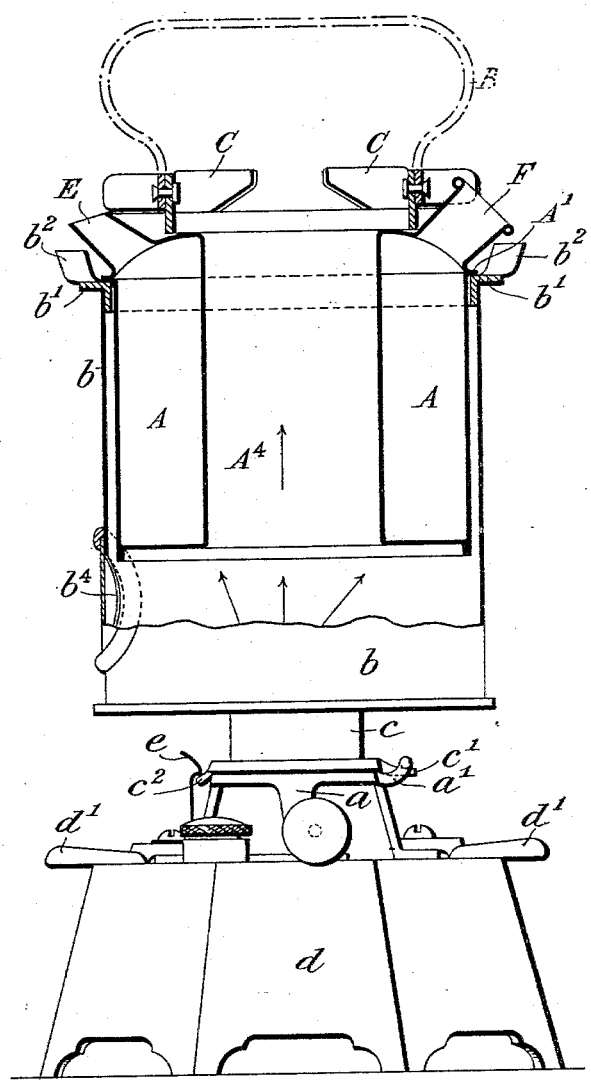
Figure 2:
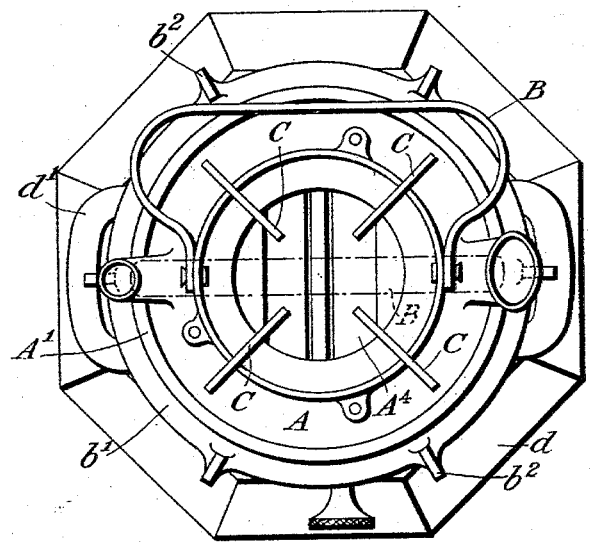
Figure 3:
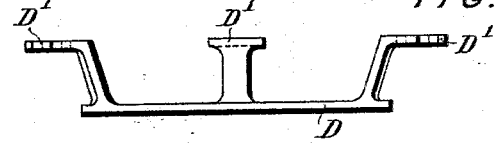

Figure 1 is a side elevation, partly in section, of an oil-stove and utensil therein according to our present invention. Fig. 2 is a plan of same. Fig. 3 is an edge view, and Fig. 4 is a plan, of a loose trivet or device for use, as hereinafter described.

Over the burner $a$ is mounted (either hinged or detachably connected, as shown, or otherwise, as desired) a case or vessel $b$, formed of an inclosing wall, of sheet-iron or tin-plate or other suitable material, open at the top. The bottom of this casing $b$ fits over or onto the hood $c$ of the burner, or this inclosing wall $b$ may be continued down to the oil-reservoir $d$, (to which same may be attached in any suitable manner,) in which latter event such lower part (not shown) of this case $b$ would be perforated or provided with openings in any suitable manner to permit admission of air to the burner. This case may be of any desired shape, but advantageously of cylindrical form, as shown, or oval, or having parallel sides with rounded ends. At or near the top of this inclosing wall $b$ we form, arrange, or mount a rim $b'$, or it may be lugs or projections $b^2$, or both $b'$ and $b^2$, as shown, or other suitable means may be used to provide a seat or seating or support for the utensil A, hereinafter described, or the latter may have simply a projecting ledge $A'$ all around, or projections at intervals around the top edge of same (or near thereto) which simply rest on the top edge or rim $b'$ of said case $b$, and thus this utensil A is held in position, and the latter, being of corresponding shape to the case, fits closely within said inclosing wall $b$, after the manner of a piston or plunger in a cylinder, or this utensil may, if desired, be of other shape or form to correspond with the case $b$. This special utensil A is essentially a kettle for boiling water, but may be used for any other desired purpose, and being made to closely fit within the case, (like a piston,) as shown, same prevents escape of heat or products of combustion between it and the inclosing wall $b$, and has a central vertical opening $A^4$, (or other opening or openings, either conical or otherwise through same,) through which the heat and products of combustion ascend. The handle B of this utensil A may advantageously be detachable or may be hinged, so as to turn down out of the way, as shown in Fig. 2. On the top of this utensil A we arrange and mount (either immovably or pivotally or removably) four or other suitable number of rests or supports C, (in the case illustrated these are fixed,) projecting above the top of the kettle A, upon which a frying-pan, pot, or other utensil can be placed, the whole of the heat coming from the burner up the passage $A^4$, through the kettle A, being thus directed against the bottom of such frying-pan, &c., (not shown,) and then is free to escape laterally through the open space left between the top of the special utensil A and the bottom of the frying-pan, &c., standing on said supports C, which latter are of a sufficient height for this purpose.

Figure 4:
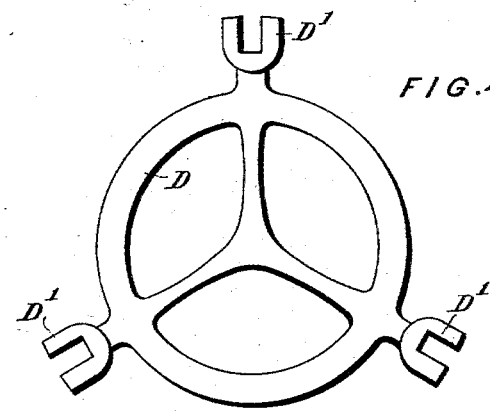

If the stove is required for use without the special utensil A, (with the aforesaid rests or supports C thereon,) same can be removed, and a grid or grill or other temporary support, such as illustrated in Figs. 3 and 4, placed in the case, upon which a pot, &c., can be stood, or other cooking operation performed, the radial arms $d'$ of this device D being forked, as shown, to fit over the rests $b^2$ to thus hold said device in position while in use.

In the case illustrated the burner-hood $c$ is attached to the bottom of the case $b$ and is detachably connected to the burner by projections $c'$ on said hood $c$ passing under lugs $a'$ on the burner $a$, a spring-catch $e$ on the opposite side engaging the projection $c^2$ on the hood c to thus lock the parts together or release same when desired to gain access to the burner or wick thereof for lighting, cleaning, filling, &c.

$d'$ $d'$ are handles fixed to the base $d$ by which to carry said stove.

$b^4$ is a window or aperture (covered with mica or other suitable transparent material) through which to see the flame to regulate same.

E is spout of kettle A. F is filling-orifice therefor.

Having thus described our invention, what we claim as new, and desire to secure by Letters Patent of the United States, is—

1. The combination with an oil-reservoir, of a burner provided with a hood, an inclosing wall mounted on the said burner and provided with supports at its upper end, a vessel provided with a central aperture and adapted to fit closely within the said inclosing wall, and a bracket mounted on top of the said vessel, substantially as described.

2. The combination with an oil-reservoir, such as $d$ forming the base or stand for the stove of a case or inclosing wall such as $b$ mounted just over the hood $c$ of the burner, rests or supports, such as $b^2$ on the outer edge of the rim $b'$ on the top of said case, a kettle such as A adapted to fit closely within said case $b$, a flange $A'$ on said kettle to support same on the said rim $b'$, a vertical passage such as $A^4$ through said kettle, and rests or supports such as C on the top of said kettle A substantially in the manner and for the purposes hereinbefore described and illustrated in the drawings hereunto annexed.

3. The combination with an oil-reservoir, of a burner provided with a hood $c$, a case or inclosing wall $b$ mounted on the said hood, rests or supports $b^2$ carried at the upper end of the inclosing wall, a vessel A adapted to fit closely within said case or wall $b$, a flange $A'$ on the said vessel, a central vertical passage $A^4$ through said vessel, the said vessel being provided with the filling-orifice F and spout E, rests or supports C on top of said vessel, and a handle carried by said supports, substantially as described.

WALTER DARBY.
ION DARBY.

Witnesses:
H. BIRKBECK,
GEORGE W. KEY.